United States Patent [19]
Robinson

[11] Patent Number: 6,141,919
[45] Date of Patent: Nov. 7, 2000

[54] ENERGY ABSORBER

[75] Inventor: William Henry Robinson, Eastbourne, New Zealand

[73] Assignee: Robinson Seismic Limited, Gracefield, New Zealand

[21] Appl. No.: 09/101,546

[22] PCT Filed: Jan. 13, 1997

[86] PCT No.: PCT/NZ97/00003

§ 371 Date: Aug. 5, 1998

§ 102(e) Date: Aug. 5, 1998

[87] PCT Pub. No.: WO97/25550

PCT Pub. Date: Jul. 17, 1997

[30]     Foreign Application Priority Data

Jan. 12, 1996 [NZ] New Zealand .............. 280822

[51] Int. Cl.[7] .................................................. E04B 1/98
[52] U.S. Cl. ................... 52/167.7; 52/167.1; 52/167.8; 52/573.1; 248/638; 248/562; 248/603
[58] Field of Search ................ 52/167.1, 167.7, 52/167.8, 573.1; 248/638, 562, 603, 636; 267/136

[56]             References Cited

U.S. PATENT DOCUMENTS

| | | | |
|---|---|---|---|
| 3,134,585 | 5/1964 | Trask ........................................ 267/1 |
| 4,117,637 | 10/1978 | Robinson ................................. 52/167 |
| 4,499,694 | 2/1985 | Buckle et al. ........................... 52/167 |
| 4,593,502 | 6/1986 | Buckle ..................................... 52/167 |
| 5,201,155 | 4/1993 | Shimoda et al. ........................ 52/167 |

FOREIGN PATENT DOCUMENTS

WO94/13974  6/1994  WIPO .

OTHER PUBLICATIONS

"High Strain Cyclic Shear of Lead" (thesis), Univ. of Auckland, Michael D. Monti, Jul. 1994, pp. 1–193.

"Lead as a Seismic Energy Dissipator", M.D. Monti et al, Univ. of Auckland, 9 pages.

11WCEE, "A Lead Shear Damper Suitable . . . ", M.D. Monti et al, Acapulco, Mexico, Jun. 23–28, 1996, 8 pages.

"Lead as a Cyclic Motion Damper", M.D. Monti et al, Univ. of Auckland, 1995, 7 pages.

Earthquake Engineering . . . , vol. 10, "Lead–Rubber Hysteretic Bearings . . . ", W.H. Robinson, 1982, pp. 593–604.

Earthquake Engineering . . . , vol. 4, "An Extrusion Energy Absorber Suitable for . . .", W.H. Robinson et al, 1976, pp. 251–259.

ASME/JSME PVP Conference, "Seismic Isolation, the New Zealand Experience", Hawaii, W.H. Robinson, 1995, 10 pages.

Eleventh World Conference . . . , "Latest Advances in Seismic Isolation", W.H. Robinson, Mexico, Jun. 23–28, 1996, p. 800.

EQE Engineering, "Earthquake Loading and Response", Kato et al, Tokyo Univ., Tokyo, Japan, pp. 839–841.

Bulletin of the New Zealand . . . , vol. 8, No. 2, "Base Isolation for Increase . . . ", Skinner et al, pp. 93–101, Jun. 1975.

An Introduction to Seismic Isolation, Skinner et al, 1993, 7 pages.

Journal De Physique IV, "Amplitude–Dependent Internal Friction in Lead at . . . ", Kustov et al, vol. 6, Dec. 1996, pp. C8–265–268.

Primary Examiner—Christopher T. Kent
Assistant Examiner—Dennis L. Dorsey
Attorney, Agent, or Firm—Jacobson, Price, Holman & Stern, PLLC

[57]           ABSTRACT

An energy absorber including a pair of shear dampers mounted back to back on a common axis. Each shear damper has a central core of damping material, confined by a laminated structure of rigid plates, preferably separated by resilient material. The cores and surrounding laminates are compressed between a pair of distal end plates and an end plate common to both dampers. The common end plate may be attached to one structural member and the distal end plates to another structural member to dampen relative motion between them.

52 Claims, 8 Drawing Sheets

FIG. 3
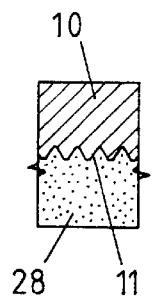
FIG. 3a
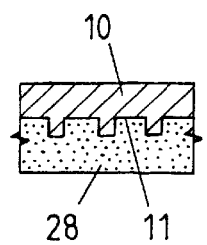
FIG. 3b
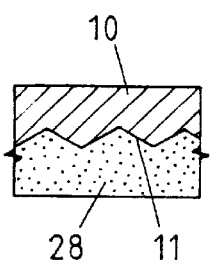
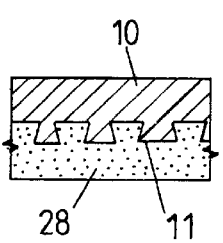
FIG. 3c
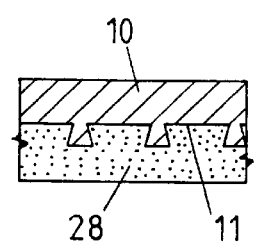
FIG. 3d
FIG. 4
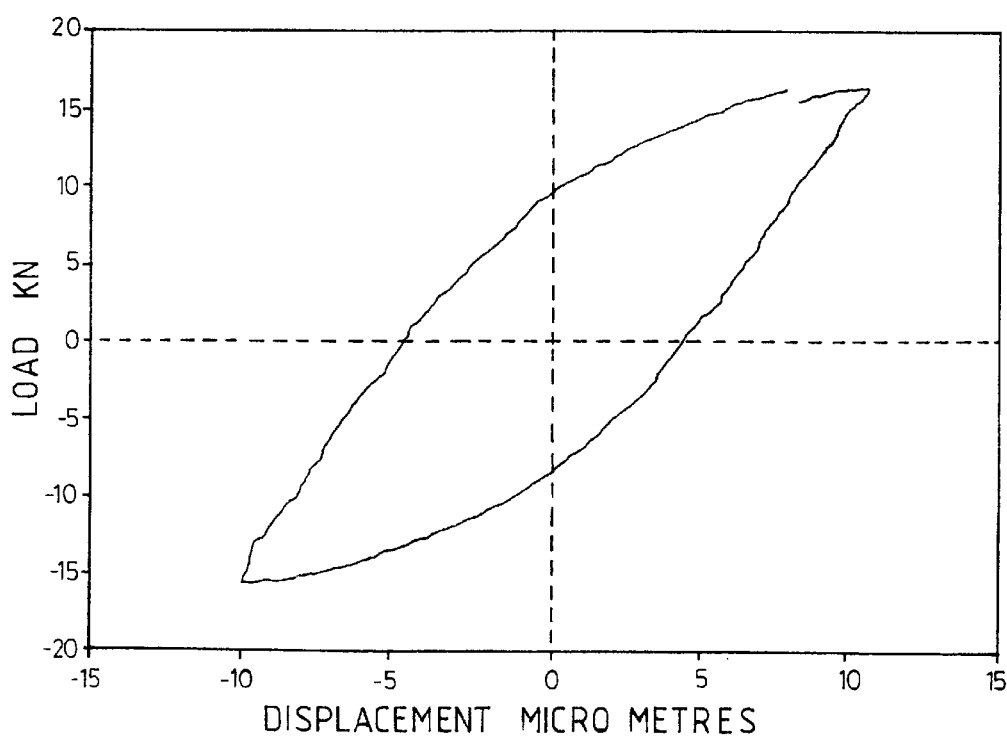

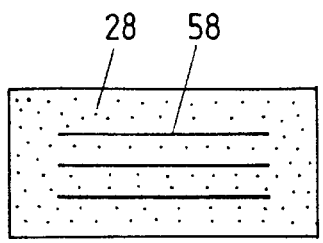
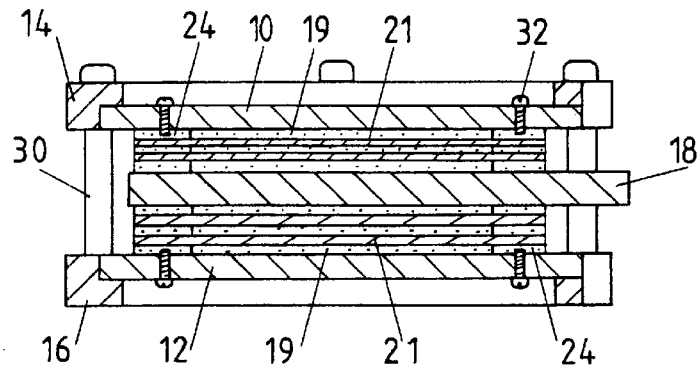
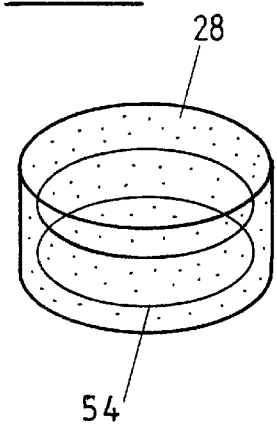
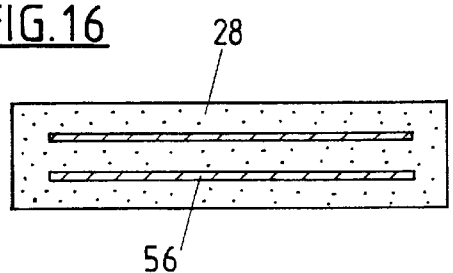
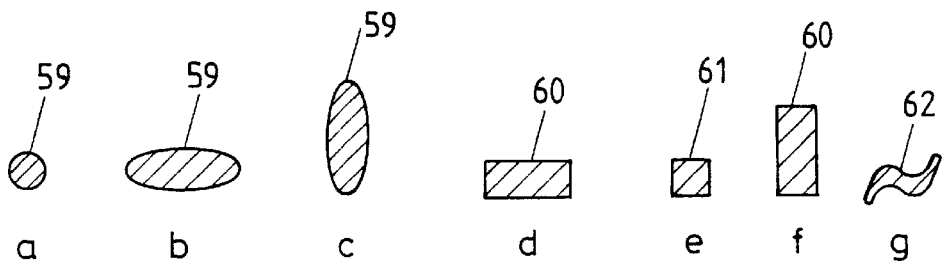

ENERGY ABSORBER

TECHNICAL FIELD

This invention relates to energy absorbers. More particularly this invention relates to a shear damper able to be used in a wide range of applications.

BACKGROUND ART

For the purposes of this specification a shear damper means a cyclic shear energy absorber of the type described in WO94/13974; U.S. Pat. Nos. 4,117,637, 4,499,694; 4,593,502; and 4,713,917, the specifications of which are hereby incorporated by reference. Shear dampers have been used primarily in seismic isolation of structures. Seismic isolation involves increasing the natural period of a structure to outside the period of the exciting motion. This reduces the forces transmitted into a building through decoupling. The addition of a damping mechanism to dissipate the associated energy, thereby controlling the displacements and further reducing the accelerations transmitted to the structure, establishes a seismic protection system. This method of protection is suitable for structures with natural periods of less than 1.5 seconds. More of the principles of seismic isolation are described in Skinner et al, (see references at the end of the description).

Energy absorbers of this type to date have been designed to be weight bearing and are known in the art as lead rubber bearings. That is, the structure or parts of a structure to be damped from induced motion rest on top of the bearing and the bearings themselves rest either on the ground or on another part of the structure. These devices are intended to absorb earthquakes or wind loads, but are resistant to lesser forces.

It has been known for some time that energy absorbers can be used as dampers to control the elastic and plastic deformation of tall structures with natural periods greater than 1.5 seconds (Scawthorn et al, 1995). Dampers can be interposed laterally between structures or parts of structures to damp motion. The vibrations which may be damped may be very small.

It would be useful to be able to take advantage of shear dampers for uses other than as bearings in damping motion induced on structures. For example, shear dampers would be useful in applications such as damping vibrations in machinery, in penstocks of hydro-electric power stations or the like, in rolling stock such as heavy trucks or railway freight cars, carriages or engines or any similar vibrations.

It is an object of this invention to go some way towards achieving this desideratum or at least to offer the public a useful choice.

DISCLOSURE OF INVENTION

The invention may be said broadly to consist in an energy absorber comprising:
  a pair of shear dampers mounted back to back along a common axis, each said damper comprising a pair of rigid end plates, a laminated structure of rigid plates able to slide past one another and a core of plastically deformable material in a bore through said rigid plates from the inner face of one end of said end plate to the inner face of the other said end plate,
  means to urge said end plates toward one another to maintain each said core at a hydrostatic pressure at least approaching the shear yield stress of said plastically deformable material,
  the two end plates at the distal ends of said pair of dampers being commonly attachable to a first portion of a structure,
  the two dampers having a common end plate at their adjacent ends, said common end plate being attachable to a second portion of a structure,
  the average cross-sectional area of the core in each said damper being from about 5% to about 95% of the average total cross-sectional area of each said damper,
  the arrangement and construction being such that in use said energy absorber, when attached to a first and second structure or portions of a structure, dampens relative motion therebetween.

Preferably each said core is lead.

Alternatively each said core is of high purity aluminium, tin, zinc, indium or iron, or alloys of lead, aluminium, tin, zinc, indium or iron or any superplastic alloy or other material having a low rate of work hardening.

In still a further alternative each said core is densely packed granular material such as is described in U.S. Pat. No. 4,713,917.

Preferably said granular material is steel, glass beads, alumina, silicon carbide or any other similar hard granular material.

Alternatively said granular material is granular iron, lead, aluminium or other similar less hard material.

Preferably said end plates and said rigid plates are of steel.

Alternatively said end plates and said rigid plates are of aluminium or aluminium alloy.

Alternatively said end plates and said rigid plates are of ceramic material or other suitable material.

Preferably said rigid plates are separated by resilient material.

Preferably said resilient material is rubber.

Preferably said means urging said end plates toward one another comprises a pair of clamping members which clamp said distal end plates towards one another.

Preferably said pair of end plates at said distal ends are attachable to said first structure by means of a connecting member connected to said clamping members.

Preferably said common end plate to said bearings is attachable by an attachment member to a second portion of a structure.

Preferably said attachment member is a lateral extension of said common end plate.

Preferably the average cross-sectional area of each said core is about 50–95% of the average total cross-sectional area of the bearing.

Preferably said cross-sectional area of each said core is about 50% of the average total cross-sectional area of said bearing.

Preferably each said core has a regular geometric cross-section.

Preferably each said core is cylindrical.

Alternatively each said core has a square cross-section.

Alternatively each said core is of variable geometric cross-section.

Preferably each said core has an hour glass shape when viewed in side elevation.

Preferably each said damper has a regular geometric cross-section.

In one alternative said regular cross-section is circular.

In another alternative said regular cross-section is square.

In another alternative said regular cross-section is rectangular.

In another alternative said regular cross-section is elliptical.

Preferably there is a bond between the inner face of each of said distal end plates and the inner face of said common end plate with the ends of the core of each said shear damper.

Preferably the bond is a mechanical bond.

Preferably said mechanical bond is formed by grooving the inner faces of said end plates.

Preferably said grooving is in a circular or spiral pattern.

Alternatively said mechanical bond is formed by soldering.

Alternatively said bond is formed by adhesive.

Alternatively said bond is formed by vulcanized rubber.

Alternatively said grooving is in the form of straight grooves at right angles to the direction of movement of forces to be damped by said absorber.

Alternatively said grooving is in the form of straight grooves at any angle to the direction of movement of forces to be damped by said absorbers.

Alternatively said grooving has been effected by peening or sand blasting.

Alternatively said grooving is in the form depicted in any one of FIGS. 3a–d.

Preferably when said core is cylindrical, said alternating layers of steel and resilient material form an annulus therearound.

Preferably when said core is lead, said hydrostatic pressure is from about 5 MPa to about 80 MPa.

More preferably when said core is lead said hydrostatic pressure is equal from about 10 MPa to about 30 MPa.

Most preferably when said core is lead said hydrostatic pressure is about 50 MPa.

Preferably said cores within said energy absorber contain elements embedded therein of material stiffer than the core material to thereby reduce migration of core material during damping.

Preferably said elements are aligned to provide rigidity in the planes of deformation of said cores.

Preferably when said cores are of lead said elements are of metal, carbon fibre, fibreglass or other material which is stiffer than lead.

Preferably said elements are in the form of rods, wire strips, mesh, disks or any similar form.

In one alternative embodiment said elements comprise said rigid plates in said laminated structure, said rigid plates extending through said core of plastically deformable material across substantially the whole cross-section of each said shear damper whereby said core is discontinuous consisting of alternating layers of core material and rigid plates.

In another embodiment the invention may be said broadly to consist in an energy absorber comprising:

two pairs of shear dampers, each pair mounted back to back along a common axis, each said damper pair comprising a pair of rigid end plates, a laminated structure of rigid plates able to slide past one another and a core of plastically deformable material in a bore through said rigid plates from the inner face of one end of said end plate to the inner face of the other said end plate, means to urge said end plates of each said pair toward one another to maintain each said core at a hydrostatic pressure at least approaching the shear yield stress of said plastically deformable material, the two end plates at the distal ends of each of said pairs of dampers being joined to one another, the two dampers of each said pair having a common end plate at their adjacent ends, said common end plate of one said pair being attachable to a first structure and said common end plate of the second said pair being attachable to a second structure, the average cross-sectional area of the core in each said damper being from about 5% to about 95% of the average total cross-sectional area of each said damper, the arrangement and construction being such that in use said energy absorber, when attached to a first and second structure or portions of a structure, dampens relative motion therebetween.

The invention may be said broadly to consist in an energy absorber as defined above in combination with two structures or two parts of a structure to dampen motion therebetween.

The invention may also be said broadly to consist in an energy absorber substantially as herein described with reference to FIGS. 1 to 3d and 7 to 17 of the drawings.

In another embodiment the invention may be said broadly to consist in a method of damping relative motion between two structures or between two parts of a structure which comprises selecting an energy absorber as defined herein with energy absorbing properties to damp forces anticipated to act on said two structures or two parts of a structure and attaching the respective connecting members of said energy absorber to said two structures or two parts of a structure.

In another embodiment the invention may be said broadly to consist in a method of manufacturing an energy absorber of the type defined herein which comprises, forming a laminate of one said end plate and said rigid plates and (where present) said resilient material, inserting a plug of damping material into the core of said damper and securing the other said end plate onto said laminate, subjecting said end plates of said damper to a pressure and for a time sufficient to allow said damping material to flow into the interstices in the sides of the bore through said rigid plates and resilient material adjacent said core and into the scoring in the inner faces of the end plates of said damper.

Preferably said plug of damping material is lead and said end plates are subjected to a pressure of at least 50 MPa.

Preferably when said pressure is about 50 MPa it is applied for at least 5 minutes.

Preferably said end plates are subject to a pressure of at least 100 MPa.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

One preferred form of the present invention will now be described with reference to the accompanying drawings in which;

FIG. 3 is a detailed sectional view showing the scoring on the inner face of an end plate forming a mechanical bond with a lead core.

FIGS. 3a–d are sectional views on a larger scale than FIG. 3 of alternative shapes for forming a mechanical bond between the end plate faces and the lead core.

FIG. 4 is an hysteretic force-displacement curve for an absorber according to the invention tested at ±10 μm.

FIG. 14a is a schematic sectional representation of a core of an energy absorber according to the invention in which reinforcing disks have been embedded to reduce migration of core material.

FIG. 14b is a cross-sectional view of an energy absorber as shown in FIG. 2 modified to have alternating layers of core material and rigid plates.

FIG. 15 is a perspective representation of another core in which a pair of stiffening wire rings have been incorporated into a core of an energy absorber according to the invention.

FIG. 16 is a sectional representation of a pair of rods in a rectangular core to provide stiffening to reduce migration of core material.

FIGS. 17a–g are cross-sectional views of stiffening elements to be embedded in a core.

MODES OF CARRYING OUT THE INVENTION

Figure 1:
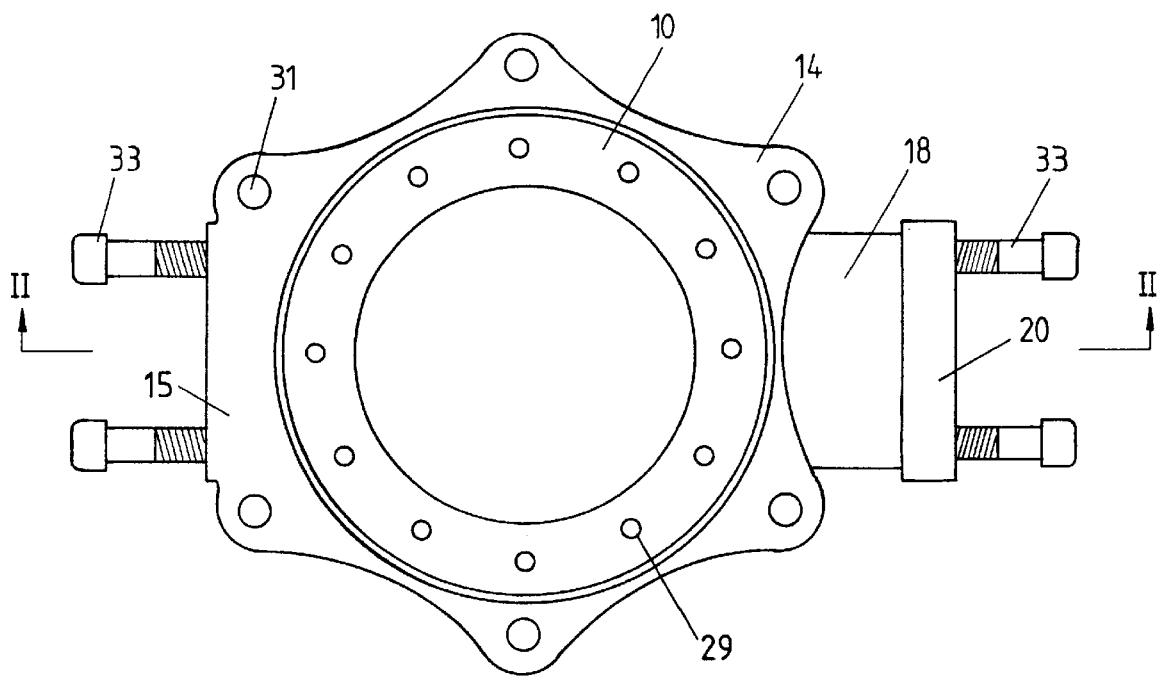
FIG. 1 is a top plan view of an absorber according to the invention.

As modern structures have evolved so too have the requirements placed on the materials from which they are constructed. In response, new technology has been developed to counter new problems presented by increasingly larger structures. The energy absorber of this invention may be used to damp small and persistent vibrations encountered in the wind response of very tall structures while also reducing the large deflections associated with earthquake motion. This is achieved through the concept of "added damping" or "supplementary damping" which involves a uniform increase of damping of a structure by distributing many small damping devices throughout the structure. In addition absorbers according to this invention may be used to increase the stiffness of a building in which they are installed.

Lead Shear Damper

The preferred embodiment of the energy absorber of this invention is called a lead shear damper. The lead shear damper is a compact device which is sensitive to very small displacements. Significant hysteretic damping can be achieved at displacements as low as ±2 μm. It can be used as "added" or "supplementary" damping in flexible structures through the distribution of many small capacity devices throughout the structure. This approach is suitable for structures whose periods fall outside the practical range of seismic isolation. The uniform distribution of damping thus achieved is able to create a highly damped structure.

The preferred range of the lead shear damper is from ±2 μm to ±10 mm. Larger displacements are available with larger devices but sensitivity decreases as size increases. A 100 mm displacement damper will begin to give appreciable hysteretic damping at 20 μm. Such a device has a dynamic range of 4 orders of magnitude. The forces achievable with a prototype of the energy absorber of this invention range from 1 kN to 200 kN. The lead shear damper of this invention is capable of sustaining thousands of cycles at any amplitude within its design range without deterioration or needing maintenance.

The damping of this device is achieved by plastic deformation of the lead core. This allows dissipation of plastic energy while maintaining mechanical properties. This is achieved by dynamic and meta-dynamic recrystallization of lead. [See Monti el al, (1995)]. The lead shear damper is preferably designed to be included in a flexible structure at any point of flexure where displacement can be converted to damping, such as cross bracing in a beam-column, moment resisting frame or in tie down spars on heavy pipe-work or in an industrial plant.

A shear damper according to the invention has a core of plastically deformable material surrounded by stiffening plates with a resilient or low friction material interposed between the stiffening plates. There are a pair of end plates over each end of the core. The core is preferably of pure lead. However, alloys of lead, aluminium, tin, zinc, iron, indium, superplastic alloys or other materials having a low rate of work hardening may be used. High purity aluminium, tin, zinc, indium or iron may also be employed. It also is possible to use densely packed granular materials such as sand, steel shot, glass beads, alumina, silicon carbide or any other hard granular material as a core. Densely packed granular materials which are not hard including iron, lead, aluminium and other similar substances may also be used. The laminated structure surrounding the core preferably consists of steel plates with rubber interposed between them. However, the laminated structure can comprise any construction of plates which can move laterally relative to one another during induced motion to apply shear forces to the core. The core may also consist of a stack of plates coded with a material of low co-efficient of friction to allow them to slide past one another.

DETAILED DESCRIPTION OF THE DRAWINGS

Figure 2:
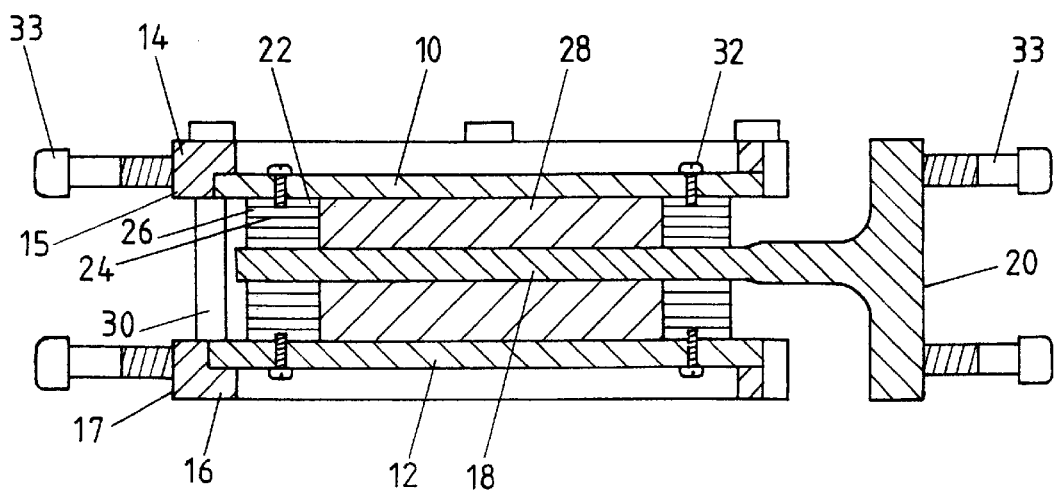
FIG. 2 is the sectional view II—II of FIG. 1.

Referring to FIG. 2 the energy absorber according to a first embodiment of the invention consists of a pair of lead shear dampers mounted end to end along a common axis. The upper lead shear damper consists of a distal end plate 10, a lead core 28, a common end plate 18 and a laminate in the form of an annulus surrounding the lead core 28. The laminate consists of a steel plate 22 in the form of an annulus of a first thickness and a set of steel plates 26 each in the form of an annulus of a lesser thickness separated by layers of rubber 24. The lower lead shear damper is of identical construction. End plates 12 and 10 are held in position by means of fixing screws 32 which pass through bores 29.

At opposite ends of the construction a pair of circular clamps 14 and 16 are urged together by six clamping bolts 30 which pass through bores 31 in the upper clamping plate 14 and into corresponding threaded bores in clamping plate 16. Preferably bolts 30 are friction bolts but any other means of locking the bolts 30 in place can be used.

In order to achieve a mechanical bond between the end plates 10, 12 and 18 and the lead core 28 the inner surfaces of plates 10 and 12 and both surfaces of plate 18 are grooved so that when the clamping plates 14 and 16 are urged together the lead flows into the grooving 11. The grooving 11 in FIG. 3 is of a spiral pattern on each of the relevant faces of the end plates.

The sectional views in FIGS. 3a to d show other possible grooving patterns which allow suitable mechanical bonding of lead to steel. When the grooving is done in a straight line the main grooving lines are preferably at right angles to the direction of forces to be imported to the damper. The inner faces of plates 10 and 12 and both faces of plate 18 may be peened, sand blasted or plated with a rough surface as form of grooving.

In a still further embodiment a layer of rubber may be interposed between the relevant steel faces of plates 10, 12 and 18 and the ends lead cores 28 and the rubber vulcanized or glued in place. The lead may also be soldered or otherwise bonded to the steel.

Bolts 30 are tightened until there is a hydrostatic pressure in the order of the shear stress yield pressure of the core material. In the preferred embodiment the core material is lead and the hydrostatic pressure is greater than about 5 MPa, more preferably between about 10 MPa and 80 MPa. A preferred range of pressure is from about 10 MPa to about 30 Mpa. A most preferred pressure is about 50 MPa.

In the manufacture of absorbers according to this invention the two dampers are assembled without the distal end plates 10 and 12 and the lead cores or plugs 28 inserted. The end plates 10 and 12 are secured in place by fixing screws 32. The end plates are then subjected to an external pressure, for example in an hydraulic press, of at least 50 MPa for at least 5 minutes so that the lead in cores 28 flows into the interstices between the core edges of plates 24 and resilient material 28 and into the grooving 11 of the inner faces of end plates 10, 12 and 18. At higher pressures a residence time of less than 5 minutes may be sufficient.

The compressive pressure applied to the core is preferably of the same order the compressive yield pressure of-the core. In the case of lead in a lead shear damper this is 50 MPa.

In the embodiment shown in FIGS. 1 to 3 the average percentage of the cross-sectional area of the shear damper made up of the lead core is about 50%. This provides an elastic stiffness of about the middle range for this embodiment. The stiffness can be increased by having a greater percentage of the cross-section as lead and the elasticity increased by having a lesser percentage of the cross-section as lead.

In operation, the ends 15 and 17 of clamping rings 14 and 16 receive a connecting member (not shown) which is attached by bolts 33. The connecting member connects a structure or one part of a structure to the energy absorber. Common end plate 18 has a flange 20 which may also be joint to a connecting member to another structure or part of a structure by means of bolts 33.

The second embodiment of the invention illustrated in FIGS. 7–10 is substantially the same as that of the first embodiment described with reference to FIGS. 1–3. Where the construction is identical reference may be made to the description of FIGS. 1–3.

The energy absorber also comprises a pair of shear dampers having distal end plates 10 and a common end plate 18. The cores 28 are compressed together by clamping plates 14. On the left side of each of FIGS. 7–10 attachment to a structural unit is done through bolts as in the embodiment illustrated in FIGS. 1 and 2. Where the construction of the second embodiment differs from that of the first is in the attachment member 34 which is an extension of an integral with common end plate 18. In the embodiment illustrated attached with member 34 has six bores 36 therethrough which may be used to attach it to a structural member in use. Attachment member 38 has a pair of-slots 34 which allow clamping bolts 30 to pass therethrough when the energy absorber has been assembled.

Figure 8:
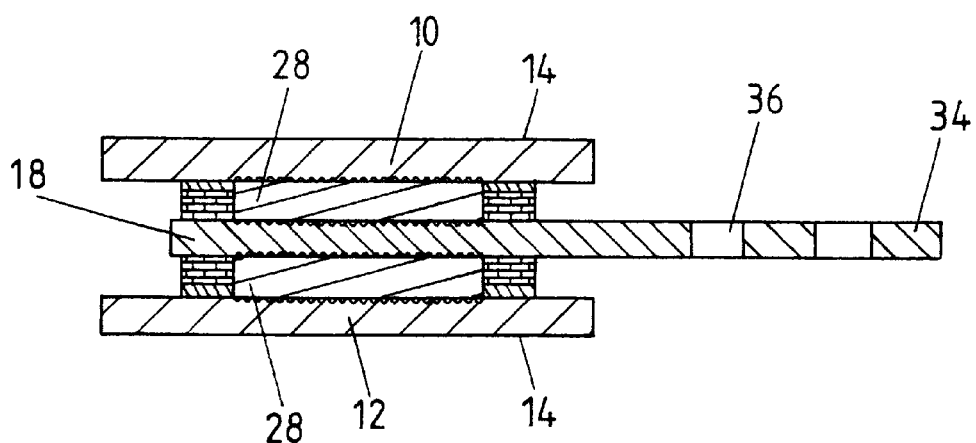
FIG. 8 is the view VIII—VIII in FIG. 7.
Figure 9:
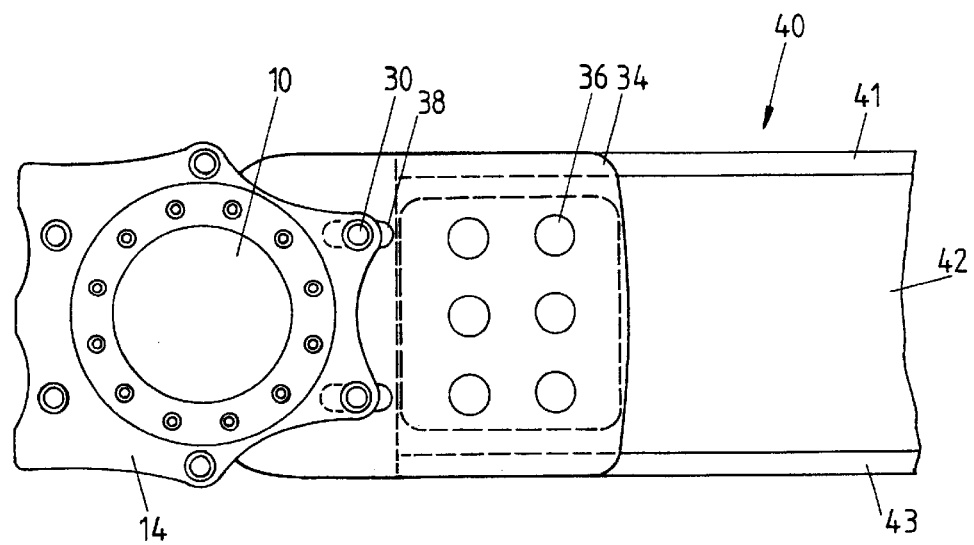
FIG. 9 is the view IX—IX shown in FIG. 10 of the embodiment of the invention shown in FIG. 9 position to be attached to a channel girder.
Figure 10:
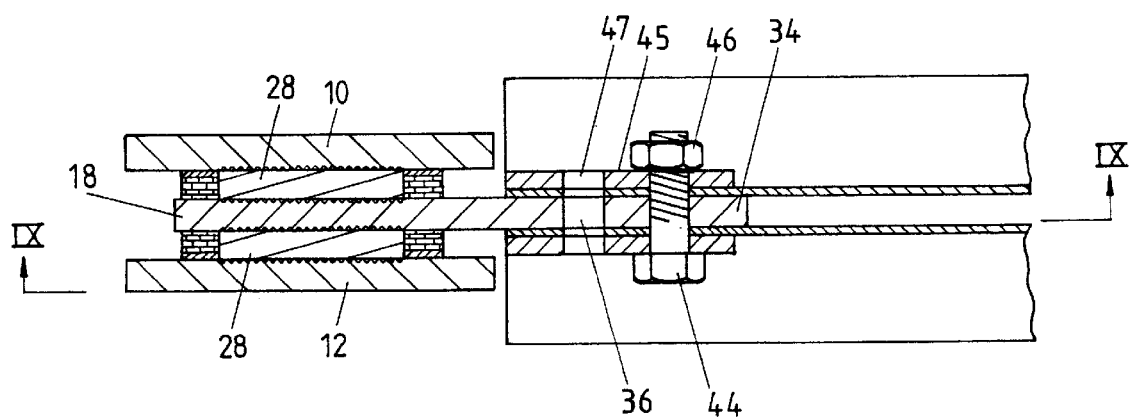
FIG. 10 is the same view of the second embodiment as is shown in FIG. 8 with the attachment member between two girders to which the energy absorber is to be attached.

One mode of attaching the attachment member 34 to a structural member is illustrated in FIGS. 9 and 10. A girder 40 is a U-shaped in cross-section. Girder 40 consists of a main member 42 and side members 41 and 43 extending at right angles to the main member 42. As is illustrated in FIG. 10 an energy absorber according to the invention may be attached to a pair of girders 40. On the face of each main member 42 between the side members 43 there is provided an attachment plate 45 having six bores 47 positioned to be in register with the bores 36 through attachment member 34. In one preferred embodiment a friction bolt 44 passes through bores 36 and 47 and is secured by a nut 46. By this means the pair of girders 40 are attached to the attachment member 34 of the energy absorber illustrated in FIGS. 7–10.

Other means of attachment such as rivetting or welding may be used. The number of cycles to be damped by the energy absorber will determine which form of attachment is needed. For structures subject to frequent wind loading friction bolts have been shown to provide the optimum connection.

Figure 11:
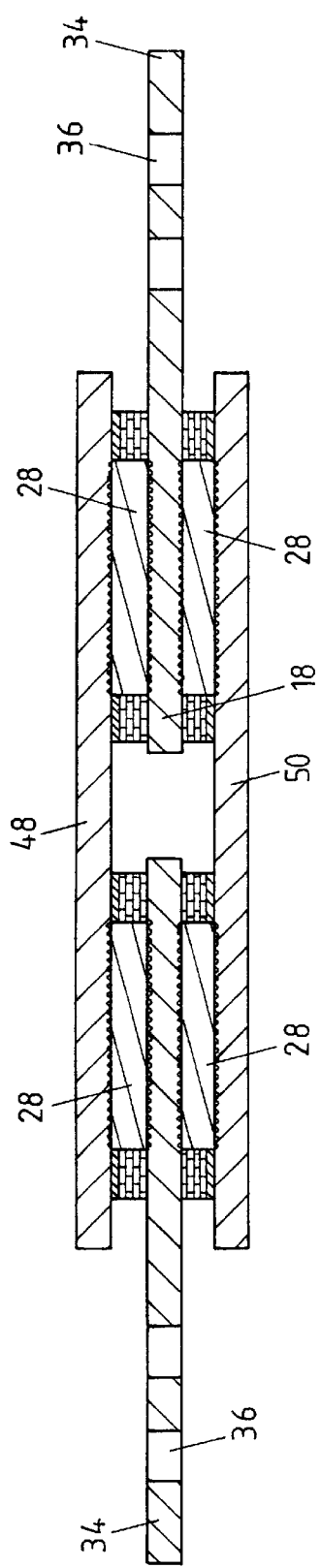
FIG. 11 is the sectional view XI—XI shown in FIG. 12 of two energy absorbers of the type shown in FIGS. 7–10 joined in parallel to one another.
Figure 12:
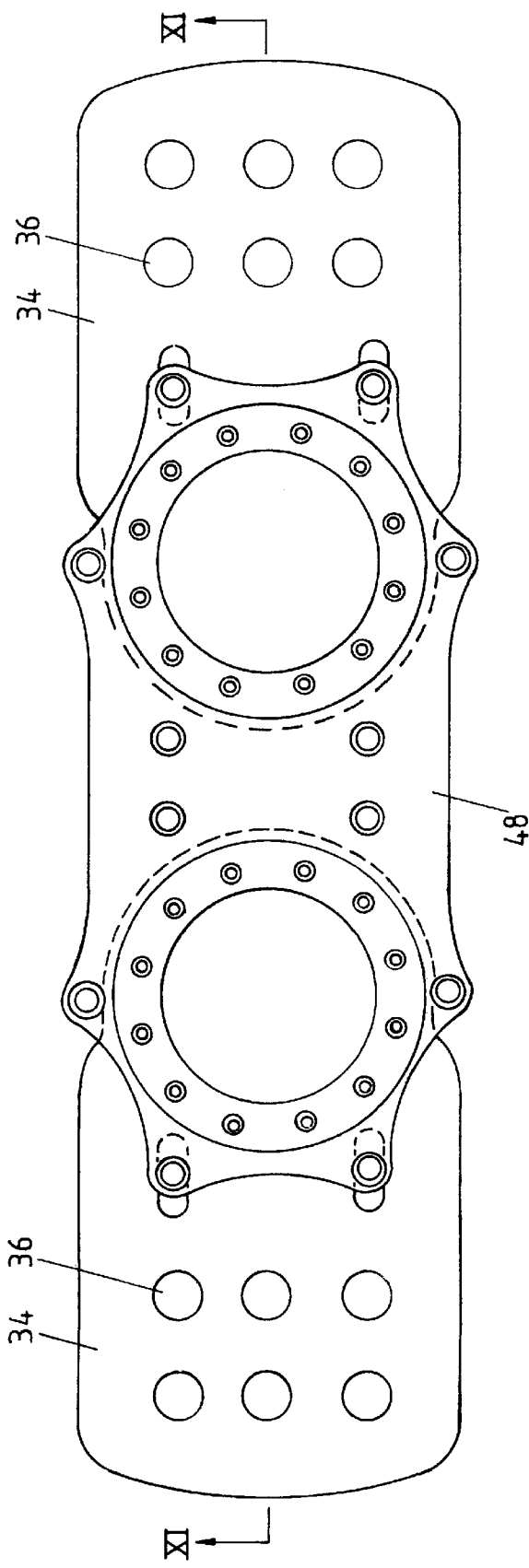
FIG. 12 is a top plan view of the embodiment of FIG. 11.

Another embodiment of the invention in which two pairs of shear dampers are connected in parallel is illustrated in FIGS. 11 and 12. The construction of each pair of shear dampers is identical to that in FIGS. 7–10. In the assembly of FIGS. 11 and 12 each pair of shear dampers shares common clamping members 48, 50 at their distal ends. The other details of construction and means of attachment to structural members such as girders is as illustrated with relation to FIGS. 9 and 10.

The difference in construction between the double pair embodiment of FIGS. 11 and 12 and the embodiments of FIGS. 1 and 2 and 7 to 10 is that the clamping plates 48 and 50 are not able to be connected to structures or pairs of structures. Instead the attachment members 34 extending from common end plates 18 of each pair of shear dampers are used for this purpose.

In operation each pair of shear dampers operates in series with the other pair. This enables the stroke of the energy absorber shown FIGS. 11 and 12 to be double that of the absorber shown in FIGS. 7 to 10. Similarly, if one pair of dampers were connected to another pair in parallel the damping force could be doubled.

A number of different shapes can be employed for the cores and surrounding laminate. Six alternatives to the cylindrical cores in the embodiments illustrated are shown in FIGS. 13a–13f.

Figure 13A:
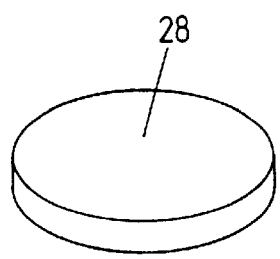
FIGS. 13a–f show alternative shapes for the cores of the energy absorbers of FIGS. 1–3 and 7–12.
Figure 13B:
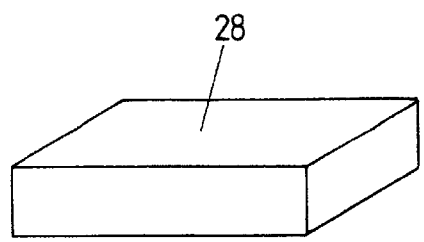
Figure 13C:
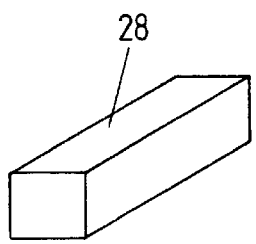
Figure 13D:
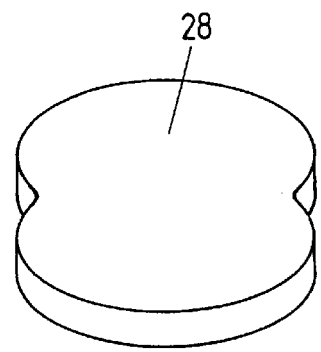
Figure 13E:
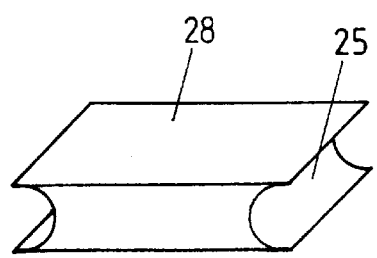

In FIG. 13a, the core 28 is elliptical in cross-section with straight sides. The cores 28 of FIGS. 13b and c are cylindrical in cross-section with straight sides. FIG. 13d illustrates a core 28 which is two intersecting ellipses in cross-section and straight sides. FIG. 13e shows a core 28 which is rectangular in section with a variable cross-sectional area. The minimum cross-sectional area is at the centre and the maximum at the ends giving side 25 a bowed configuration.

Figure 13F:
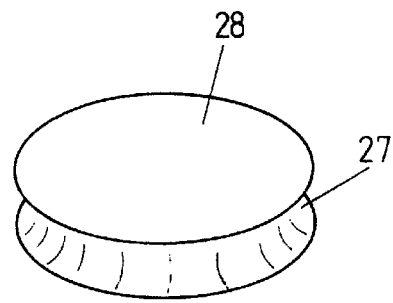

In FIG. 13f an elliptical core 28 is illustrated with a variable cross-section. This also produces a bowed side 27.

The shape of shear damper cores is not limited to the embodiments illustrated in FIGS. 13a–13f and other embodiments will be useful for other applications of the invention.

In applications where shear dampers are subjected to many thousands of cycles over their lifetimes there is a tendency for core material to migrate into the surrounding layers of plates and resilient material. This migration will occur in the same direction as the motion which is being damped. One way of reducing this migration is to embed stiffening elements into the core material. The reduction of migration is most effective if the stiffening elements are aligned so as to impact the maximum stiffness in the direction of displacement of the energy absorber. Possible ways of doing this are illustrated in FIGS. 14, 15 and 16.

In FIG. 14a, the core material 28 has embedded therein disks or plates 52. Discs 52 may be of a diameter less than the diameter of core 28 or they may be the sane. The faces of discs 52 are preferably grooved in the same way as is illustrated in FIGS. 3a–d to assist in retarding migration of core material. Such an embodiment is, in effect, a laminated structure which may be constructed without embedding stiffening elements in the core. Rather, a laminate is formed of alternating layers of core 28 and discs 52.

In FIG. 14b there is illustrated a pair of back to back shear dampers in which each steel plate 21, instead of being in the form of an annulus as in FIG. 2, extends across substantially the cross-section of each shear damper of the energy absorber. Alternating with each plate 21 is a layer of lead 19 (the preferred core material). An annulus of rubber 24 (a preferred elastomer material) encircles each layer of lead 29 at its circumference. The remainder of the assembly is the same as that illustrated in FIG. 2. Common end plate 18 separates the pair of dampers. Distal end plates 10 and 12 are clamped between clamping plates 14 and 16 in the manner described in relation to FIG. 2.

In operation as motion from side to side, relative to FIG. 14b, is damped, plates 21 act to reduce migration of lead in the directions of motion damped by the absorber. Migration of lead into rubber annuli 24 at either side is reduced in this application.

As in the other embodiments the upper and bottom faces of plates 21 are preferably grooved where they contact lead layers 19 in order to increase mechanical bonding between them.

In a further embodiment annuli 24 may be omitted entirely and layers of lead 19 extend to the same circumference as the plates 21.

In the embodiment illustrated in FIG. 15 the core material 28 has embedded therein continuous wire ring 54 of cross-sections as illustrated in FIG. 17. The cores 28 of each of FIGS. 14a and 15 are cylindrical.

The core 28 in FIG. 16 is of rectangular cross-section. Embedded within that core 28 are illustrated a pair of stiffening rods 56. The number of stiffening rods and their alignments can vary according to the overall shape of the core.

Possible cross-sections of wires 54 or rods 56 are illustrated in FIGS. 17a–g. Rod or wire 58 in FIG. 17a is circular. Wire or rod 59 in FIGS. 17b and c are elliptical. Wire or rod 60 in FIGS. 17d and f are rectangular in cross-section. Wire or rod 61 illustrated in FIG. 17e has a square cross-section. The cross-section of wire or rod 62 in FIG. 17g roughly approximates the letter "S".

The stiffening elements for use in reducing migration of the core material may be composed of a number of different materials. It is necessary that the elements have a greater stiffness than the core material itself. It is also advantageous that the rigidity is in the plane of deformation of the core.

EXAMPLE 1

Test of First Embodiment

Six devices of the embodiment illustrated were tested on the double shear test rig (750 kN) and Instron test machine (250 kN) of Penguin Engineering Limited in Gracefield New Zealand. The operation of the text rigs is described in Robinson 1995. The design displacements of the devices tested were in the order of ±2 $\mu$m to ±10 mm. Successful tests were achieved across the range from ±2 $\mu$m to ±17 mm.

The second experimental device tested sustained 1226 cycles at various amplitudes across its working range, including a 1000 cycle test at ±0.7 mm, with negligible change in the hysteretic properties of the device. The device of which the results are shown here, sustained 217 cycles at a range of displacements including three cycles at ±1.7 times the design displacement, with little change in the hysteretic properties of the device.

Figure 5:
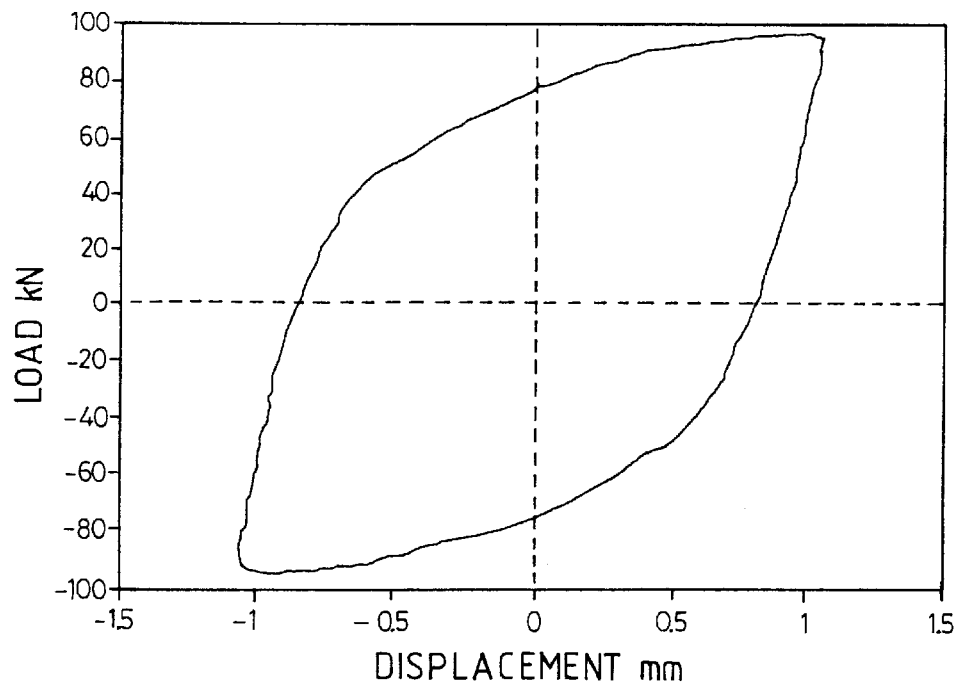
FIG. 5 is an hysteretic force-displacement curve for an absorber according to the invention tested at ±1.1 mm.
Figure 6:
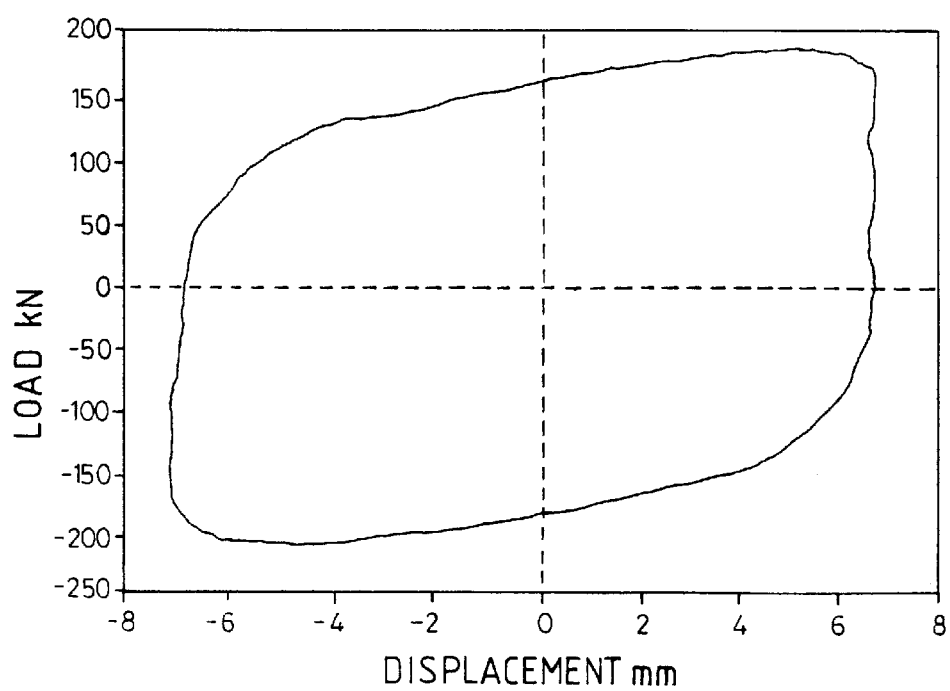
FIG. 6 is an hysteretic force-displacement curve for an absorber according to the invention tested at ±6.9 mm.

That the devices tested show hysteretic behaviour over a range of displacements is shown by the curves in FIGS. 4 to 6. These show hysteretic behaviour at very small (±10 $\mu$m), medium (±1.1 mm) and large (±6.9 mm) displacements respectively.

The testing programme has shown the lead shear damper to behave as an almost perfect plastic device. It provides significant hysteretic damping at displacements as low as 2$\mu$ and a reliable range of operating displacements of four orders of magnitude. It has exhibited constant and reliable properties through extensive testing after 1000 cycles. After a large displacement at the top end of its working range the device remained just as sensitive when tested at the bottom end. At displacements of the order of twice the working range the damper provided reliable damping for many cycles. However, the elastomer was stretched beyond its elastic limit and fractured.

EXAMPLE 2

Test of Second Embodiment

Figure 7:
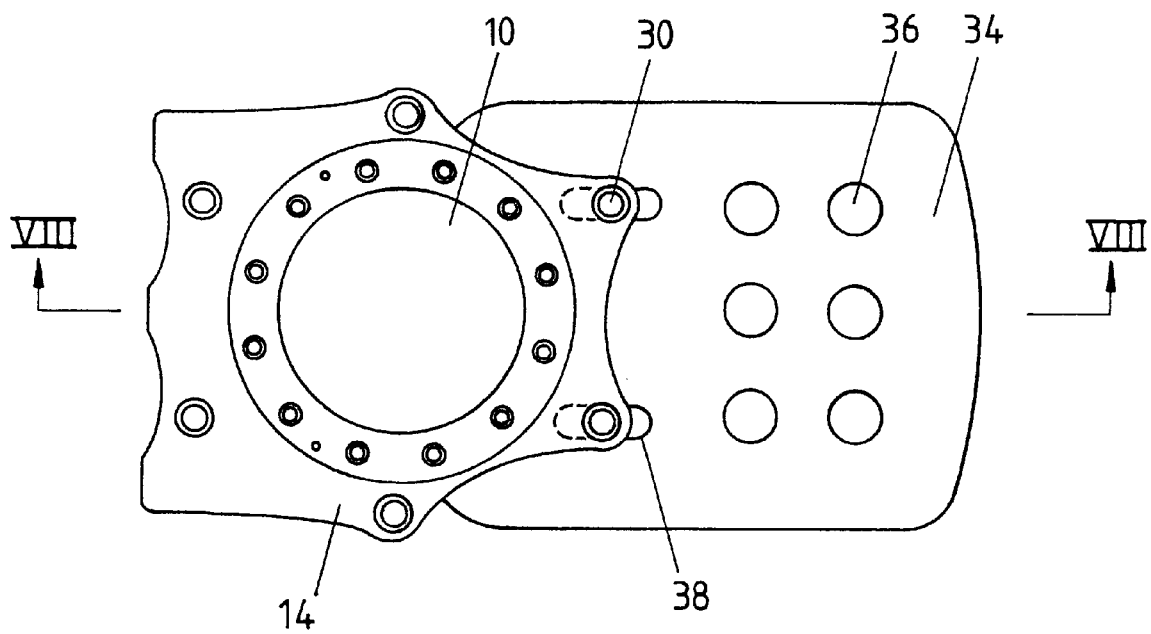
FIG. 7 is a top plan view of a second embodiment of an energy absorber according to the invention.

A prototype energy absorber as described in FIGS. 7 and 8 was subjected to a testing programme using the same testing machines as in Example 1. The energy absorber according to the second embodiment of the invention was subjected to 141,440 cycles at various amplitudes until the testing machine itself failed. The absorber in the last such cycle had a damping force within 15% of the first cycle and this was regarded as a pass within the design parameters.
Installation The distribution of energy absorbers according to the invention throughout new and existing structures provides control of the performance of structures. The advantage of the approach is that it enables specific damping to be prescribed by the designer/engineer. The prototype lead shear damper according to the invention has a hysteretic behaviour which is "plastic" or "Coulombic" in nature exhibiting very little rate dependence in the damping force. Prototype dampers tested have had damping forces of 10 kN to 200 kN, and operate at displacements of 2 $\mu$m to 10 mm.

The energy absorber according to the invention is suitable for reducing the motion induced in flexible structures by wind and earthquakes on the one end of-the scale down to small vibration and small displacements at the other end of the scale.

The energy absorbers according to the invention are easy to install and allow the architect/designer greater freedom and design choice.

The ranges of damping force and displacement expected for commercial devices are from the very small of the order of at 1N, with ±0.0001 $\mu$m to 1 mm displacement, to the very large at 10GN, with ±50 $\mu$m to 1.0 m.

The energy absorbers of this invention may be used for a wide range of applications involving the damping of vibrations. These range from damping vibrations in penstocks of hydro-electrical installations to damping of vibrations in heavy machinery or rolling stock, such as heavy trucks, railway freight cars, carriages or engines.

Other embodiments of the invention will be apparent to those skilled in the art.

REFERENCES

Kustov, S., Golyandin, S., Sapozhnikov, K. and Robinson, W. H., "Influence of Prestrain on Internal Friction of Aluminum, Indium and Lead Polycrystals." IX International Conference on Imperfections and Anelastic Phenomena in Solids, Tula, Russia, September 1997.

Monti, M. D. (1994) "HIGH STRAIN CYCLIC SHEAR OF LEAD" Masters Thesis, University of Auckland Monti, M. D; Ferguson, W. G and Robinson, W. H (1995) "LEAD AS A SEISMIC ENERGY DISSIPATOR" *IPENZ Annual Conference* vol 2 p444–p450

Monti, M. D; Ferguson, W. G and Robinson, W. H (1995) "LEAD As A CYCLIC MOTION DAMPER" *Pacific Conference on Earthquake Engineering* vol 3 p323–p330

Monti, M. D and Robinson, W. H (1996) "A LEAD-SHEAR DAMPER SUITABLE FOR REDUCING THE MOTION INDUCED BY WIND AND EARTHQUAKE" *Proceedings of* 11 *WCEE Mexico City*

Robinson, W. H (1982) "LEAD-RUBBER HYSTERETIC BEARINGS SUITABLE FOR PROTECTING STRUCTURES DURING EARTHQUAKES" *Earthquake Eng. and Str. Dyn* vol 10 p593–p604

Robinson, W. H and Greenbank L. R (1976) "AN EXTRUSION ENERGY ABSORBER SUITABLE FOR THE PROTECTION OF STRUCTURES DURING AN EARTHQUAKE" *Earthquake Eng. and Str. Dyn* vol 4 p251–p259

Robinson, W. H (1995) "SEISMIC ISOLATION, THE NEW ZEALAND EXPERIENCE" *ASME/JSME PVP Conference Hawaii* 1995

Robinson, W. H (1996) "RECENT DEVELOPMENTS IN SEISMIC ISOLATION" *Proceedings of* 11 *WCEE Mexico City*

Scawthorn, C; Kato, B and Lu, L. W (1995) "CRITERIA AND LOADING" *Fifth World Congress on Habitat and the High-Rise* p839–p1150

Skinner, R. I and McVerry, G. H (1975) "BASE ISOLATION FOR INCREASED EARTHQUAKE RESISTANCE" *Bulletin of the New Zealand Society for Earthquake Engineering* vol 8 No. 2

Skinner, R. I; Robinson, W. H and McVerry, G. H (1993) "AN INTRODUCTION To SEISMIC ISOLATION" John Wiley and Sons Ltd, West Sussex, England.

What is claimed is:

1. An energy absorber comprising:
    a pair of shear dampers mounted back to back along a common axis, each said damper comprising a pair of rigid end plates, a laminated structure of rigid plates able to slide past one another and a core of plastically deformable material in a bore through said rigid plates from the inner face of one end of said end plate to the inner face of the other said end plate,
    means to urge said end plates toward one another to maintain each said core at a hydrostatic pressure at least approaching the shear yield stress of said plastically deformable material,
    the two end plates at the distal ends of said pair of dampers being commonly attachable to a first portion of a structure,
    the two dampers having a common end plate at their adjacent ends, said common end plate being attachable to a second portion of a structure,
    the average cross-sectional area of the core in each said damper being from about 5% to about 95% of the average total cross-sectional area of each said damper,
    the arrangement and construction being such that in use said energy absorber, when attached to a first and second structure or portions of a structure, dampens relative motion therebetween.

2. An energy absorber as claimed in claim 1 wherein said core is lead.

3. An energy absorber as claimed in claim 1 wherein each said core is of high purity aluminium, tin, zinc, iron or indium or alloys of lead, aluminium, tin, zinc, iron or indium or any superplastic alloy or other material having a low rate of work hardening.

4. An energy absorber as claimed in claim 1 wherein each said-core is densely packed granular material.

5. An energy absorber as claimed in claim 4 wherein said granular material is steel, glass beads, alumina, silicon carbide or any other similar hard granular material.

6. An energy absorber as claimed in claim 4 wherein said granular material is granular iron, lead, aluminium or other similar less hard material.

7. An energy absorber as claimed in claim 2 wherein said end plates and said rigid plates are of steel.

8. An energy absorber as claimed in claim 2 wherein said end plates and said rigid plates are of aluminium or aluminium alloy.

9. An energy absorber as claimed in claim 2 wherein said end plates and said rigid plates are of ceramic material or other suitable material.

10. An energy absorber as claimed in claim 2 wherein said rigid plates are separated by resilient material.

11. An energy absorber as claimed in claim 10 wherein said resilient material is rubber.

12. An energy absorber as claimed in claim 2 wherein said means urging said end plates toward one another comprises a pair of clamping members which clamp said distal end plates towards one another.

13. An energy absorber as claimed in claim 2 wherein said pair of end plates at said distal ends are attachable to sad first portion of a structure by means of a connecting member connected to said clamping members.

14. An energy absorber as claimed in claim 2 wherein said common end plate to said dampers is attachable by an attachment member to said second portion of a structure.

15. An energy absorber as claimed in claim 14 wherein said attachment member is a lateral extension of said common end plate.

16. An energy absorber as claimed in claim 15 wherein the average cross-sectional area of each said core is about 50–95% of the average total cross-sectional area of said damper.

17. An energy absorber as claimed in claim 16 wherein said cross-sectional area of each said core is about 50% of the average total cross-sectional area of said damper.

18. An energy absorber according to claim 2 wherein each said core has a regular geometric cross-section.

19. An energy absorber as claimed in claim 18 wherein each said core is cylindrical.

20. An energy absorber as claimed in claim 18 wherein each said core has a square cross-section.

21. An energy absorber as claimed in claim 18 wherein each said core has a rectangular cross-section.

22. An energy absorber as claimed in claim 18 wherein each said core has an elliptical cross-section.

23. An energy absorber as claimed in claim 2 wherein each said core is of a variable geometric cross-section.

24. An energy absorber as claimed in claim 23 wherein each said core has an hour glass shape when viewed in side elevation.

25. An energy absorber as claimed in claim 2 wherein each said damper has a regular geometric cross-section.

26. An energy absorber as claimed in claim 25 wherein said regular cross-section is circular.

27. An energy absorber as claimed in claim 25 wherein said regular cross-section is square.

28. An energy absorber as claimed in claim 25 wherein said regular cross-section is rectangular.

29. An energy absorber as claimed in claim 25 wherein said regular cross-section is elliptical.

30. An energy absorber as claimed in claim 2 wherein there is a bond between the inner face of each of said distal end plates and the inner face of said common end plate with the ends of the core of each said shear damper.

31. An energy absorber as claimed in claim 30 wherein said bond is a mechanical bond.

32. An energy absorber as claimed in claim 31 wherein said mechanical bond is formed by grooving the inner faces of said end plates.

33. An energy absorber as claimed in claim 32 wherein said grooving is in a circular or spiral pattern.

34. An energy absorber as claimed in claim 30 wherein said bond is formed by soldering.

35. An energy absorber as claimed in claim 30 wherein said bond is formed by adhesive.

36. An energy absorber as claimed in claim 30 wherein said bond is formed by vulcanized rubber.

37. An energy absorber as claimed in claim 32 wherein said grooving is in the form of straight grooves at right angles to the direction of movement of forces to be damped by said absorber.

38. An energy absorber as claimed in claim 32 wherein said grooving is in the form of straight grooves at any angle to the direction of movement of forces to the damped by said absorbers.

39. An energy absorber as claimed in claim 32 wherein said grooving has been effected by peening or sand blasting.

40. An energy absorber as claimed in claim 2 wherein said core is cylindrical and said alternating layers of rigid plates and resilient material form an annulus therearound.

41. An energy absorber as claimed in claim 2 wherein each said core is lead and said hydrostatic pressure is from about 5 MPa to about 80 MPa.

42. An energy absorber as claimed in claim 41 wherein said hydrostatic pressure is equal from about 10 MPa to about 30 MPa.

43. An energy absorber as claimed in claim 41 wherein said hydrostatic pressure is about 50 MPa.

44. An energy absorber as claimed in claim 2 wherein said cores contain elements imbedded therein of material stiffer than the core material to thereby reduce migration of core material during damping.

45. An energy absorber as claimed in claim 44 wherein said elements are aligned to provide rigidity in the planes of deformation of said cores.

46. A energy absorber as claimed in claim 44 wherein said cores are lead and said elements are of metal, carbon fibre, fibreglass or other material which is stiffer than lead.

47. An energy absorber as claimed in claim 44 wherein said elements are in the form of rods, wire, strips, mesh, discs or similar forms.

48. An energy absorber as claimed in claim 44 wherein said elements comprise said rigid plates in said laminated structure, said rigid plates extending through said core of plastically deformable material across substantially the whole cross-section of each said shear damper whereby said core is discontinuous consisting of alternating layers of core material and rigid plates.

49. A method of manufacturing an energy absorber as claimed in claim 1,
    forming a laminate of one said end plate and said rigid plates,
    inserting a plug of damping material into the core of said damper and securing the other said end plate onto said laminate,
    subjecting said end plates of said damper to a pressure and for a time sufficient to allow said damping material to flow into the interstices in the sides of the bore through said rigid plates and resilient material adjacent said core and into the scoring in the inner faces of the end plates of said damper.

50. A method as claimed in claim 49 wherein said damping material is lead and said end plates are subjected to a pressure of at least 50 MPa.

51. A method as claimed in claim 50 wherein said pressure is applied for at least 5 minutes.

52. A method as claimed in claim 49 wherein said damping material is lead and said end plates are subject to a pressure of at least 100 MPa.

* * * * *